(12) United States Patent
Han et al.

(10) Patent No.: US 11,861,086 B2
(45) Date of Patent: Jan. 2, 2024

(54) TOUCH DISPLAY PANEL, DRIVING CIRCUIT BOARD, TOUCH DISPLAY DEVICE AND DRIVING METHOD THEREOF

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Wenchao Han, Beijing (CN); Hong Yang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 623 days.

(21) Appl. No.: 16/977,151

(22) PCT Filed: Sep. 11, 2019

(86) PCT No.: PCT/CN2019/105416
§ 371 (c)(1),
(2) Date: Sep. 1, 2020

(87) PCT Pub. No.: WO2021/046762
PCT Pub. Date: Mar. 18, 2021

(65) Prior Publication Data
US 2023/0117366 A1 Apr. 20, 2023

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01)

(58) Field of Classification Search
CPC .............................. G06F 3/0412; G06F 3/044
See application file for complete search history.

(56) References Cited

U.S. PATENT DOCUMENTS

| 9,733,755 | B2 | 8/2017 | Yang |
| 10,365,743 | B2 | 7/2019 | Pan et al. |

(Continued)

FOREIGN PATENT DOCUMENTS

| CN | 104777955 | 7/2015 |
| CN | 107154218 | 9/2017 |

(Continued)

*Primary Examiner* — Hong Zhou
(74) *Attorney, Agent, or Firm* — Leason Ellis LLP

(57) ABSTRACT

A touch display panel, driving circuit board, touch display device and driving method thereof are provided. The touch display panel includes: a plurality of first data lines; a plurality of touch-control lines; a plurality of first contact pads; a plurality of first selection switches connected to the plurality of first contact pads in an one-to-one correspondence manner; each first selection switch is electrically connected to one first contact pad, one first data line and one touch-control line, and the first selection switch is configured to receive a first control signal and, according to the first control signal, electrically connect a first contact pad and a first data line during a first time period and electrically connect the first contact pad and a touch-control line during a second time period, and the first time period and the second time period do not overlap.

18 Claims, 11 Drawing Sheets

(56) References Cited

U.S. PATENT DOCUMENTS

| | | | | |
|---|---|---|---|---|
| 2014/0320446 A1* | 10/2014 | Kim | ............... | G06F 3/0446 |
| | | | | 345/174 |
| 2015/0268759 A1* | 9/2015 | Ludden | ............... | G06F 3/04184 |
| | | | | 345/174 |
| 2017/0168605 A1* | 6/2017 | Xi | ............... | G06F 3/044 |
| 2018/0059855 A1 | 3/2018 | Gwon et al. | | |
| 2018/0181277 A1* | 6/2018 | Ahn | ............... | G06F 3/0481 |
| 2021/0072854 A1* | 3/2021 | Kuo | ............... | G06V 40/1318 |

FOREIGN PATENT DOCUMENTS

| | | |
|---|---|---|
| CN | 107797687 | 3/2018 |
| KR | 20160150486 | 12/2016 |

\* cited by examiner

TOUCH DISPLAY PANEL, DRIVING CIRCUIT BOARD, TOUCH DISPLAY DEVICE AND DRIVING METHOD THEREOF

CROSS-REFERENCE TO RELATED PATENT APPLICATIONS

This application is a U.S. National Stage Application under 35 U.S.C. § 371 of International Patent Application No. PCT/CN2019/105416, filed Sep. 11, 2019, which is incorporated by reference in its entirety.

TECHNICAL FIELD

Embodiments of the present disclosure relate to a touch display panel, a driving circuit board, a touch display device, and a driving method thereof.

BACKGROUND

A touchscreen integrates two functions of display and touch-control. Depending on the structures, touchscreens can be divided into two types: plug-in touchscreens; and all-in-one touchscreens. The all-in-one touchscreens include on-cell and in-cell touchscreens. The in-cell touchscreen is widely used because it reduces the overall thickness of the touchscreen and the manufacturing cost of the touchscreen.

SUMMARY

At least one embodiment of the present disclosure provides a touch display panel, comprising: a plurality of first data lines; a plurality of touch-control lines; a plurality of first contact pads; a plurality of first selection switches connected to the plurality of first contact pads in an one-to-one correspondence manner; wherein each first selection switch is electrically connected to one first contact pad, one first data line and one touch-control line, and the first selection switch is configured to receive a first control signal and, according to the first control signal, electrically connect a first contact pad and a first data line during a first time period and electrically connect the first contact pad and a touch-control line during a second time period, and the first time period and the second time period do not overlap.

For example, in the touch display panel provided by at least one embodiment of the present disclosure, a the first selection switch includes a first transistor and a second transistor; a first electrode of the first transistor is connected to the touch-control line, a second electrode of the first transistor is connected to the first contact pad, and a gate of the first transistor is connected to a first switch signal terminal and is configured to receive a first switch signal to control turn-on and turn-off of the first transistor; a first electrode of the second transistor is connected to the first data line, a second electrode of the second transistor is connected to the first contact pad, and a gate of the second transistor is connected to a second switch signal terminal and is configured to receive a second switch signal to control turn-on and turn-off of the second transistor; the first control signal is configured to include the first switch signal and the second switch signal.

For example, in the touch display panel provided by at least one embodiment of the present disclosure, the first selection switch includes a first transistor and a second transistor; a first electrode of the first transistor is connected to the touch-control line, a second electrode of the first transistor is connected to the first contact pad through a wiring, and a gate of the first transistor is connected to a first control signal terminal to receive the first control signal; a first electrode of the second transistor is connected to the first data line, a second electrode of the second transistor is connected to the first contact pad through the wiring, and a gate of the second transistor is connected to the gate of the first transistor; the first transistor is an N-type transistor, the second transistor is a P-type transistor, or the first transistor is an P-type transistor, the second transistor is a N-type transistor.

For example, in the touch display panel provided by at least one embodiment of the present disclosure, the touch display further comprises: a plurality of second data lines, a plurality of first dummy selection switches, and a plurality of first data contact pads; each first dummy selection switch is electrically connected to one first data contact pad and one second data line, and is configured to receive the first control signal, and electrically connect a first data contact pad and a second data line according to the first control signal.

For example, in the touch display panel provided by at least one embodiment of the present disclosure, the first dummy selection switch includes a first collocated transistor and a second collocated transistor; a first electrode of the first collocated transistor is in a floating state, a second electrode of the first collocated transistor is connected to the first data contact pad, and a gate of the first collocated transistor is connected to a first switch signal terminal and is configured to receive a first switch signal, to control turn-on or turn-off of the first collocated transistor; a first electrode of the second collocated transistor is connected to the second data line, a second electrode of the second collocated transistor is connected to the first data contact pad, and a gate of the second collocated transistor is connected to a second switch signal terminal and is configured to receive a second switch signal, to control turn-on or turn-off of the second collocated transistor.

For example, in the touch display panel provided by at least one embodiment of the present disclosure, the touch display further comprises: a display circuit array, wherein the display circuit array includes a plurality of columns of pixel units, each column of pixel units includes a plurality of columns of sub-pixels, and the plurality of columns of sub-pixels are connected to a same first data line or a same second data line.

For example, in the touch display panel provided by at least one embodiment of the present disclosure, the touch display further comprises: a touch-control circuit array, wherein the touch-control circuit array includes a plurality of first touch-control electrodes, each first touch-control electrode is connected to one touch-control line, and wherein each first touch-control electrode is a self-capacitive electrode.

For example, in the touch display panel provided by at least one embodiment of the present disclosure, the touch display further comprises: a touch-control circuit array, wherein the touch-control circuit array includes a plurality of touch sensors arranged in an array, each touch sensor includes a first touch-control electrode and a second touch-control electrode, and second touch-control electrodes of touch sensors in each column are connected to a same touch-control line.

For example, in the touch display panel provided by at least one embodiment of the present disclosure, the touch display further comprises: a common signal line, wherein the common signal line is connected to the first touch-control electrode.

For example, in the touch display panel provided by at least one embodiment of the present disclosure, the first selection switch further includes a third transistor, a first electrode of the third transistor is connected to the common signal line, a second electrode of the third transistor is connected to the first touch-control electrode, and a gate of the third transistor is connected to a third switch signal terminal and is configured to receive a third switch signal, to control turn-on or turn-off of the third transistor.

For example, in the touch display panel provided by at least one embodiment of the present disclosure, the touch display further comprises: a display circuit array, wherein the display circuit array includes a common electrode, the first touch-control electrode is multiplexed as the common electrode, and the first touch-control electrode is configured to receive a common voltage.

For example, in the touch display panel provided by at least one embodiment of the present disclosure, the touch display further comprises: a second contact pad, wherein the second contact pad is connected to the common signal line to provide a voltage signals to the common signal line.

At least one embodiment of the present disclosure provides a driving circuit board, comprising: a data driving circuit; a touch detection circuit; a plurality of third contact pads; a plurality of second selection switches connected to the plurality of third contact pads in an one-to-one correspondence manner; each second selection switch is electrically connected to one third contact pad, the touch detection circuit and the data driving circuit, and the second selection switch is configured to receive a second control signal and, according to the second control signal, electrically connect a third contact pad and the data driving circuit during a first time period and electrically connect the third contact pad and the data driving circuit during a second time period, and the first time period and the second time period do not overlap.

For example, in the driving circuit board provided by at least one embodiment of the present disclosure, the second selection switch includes a fourth transistor and a fifth transistor; a first electrode of the fourth transistor is connected to the touch detection circuit, a second electrode of the fourth transistor is connected to the third contact pad, and a gate of the fourth transistor is connected to a fourth switch signal terminal and is configured to receive a fourth switch signal to control turn-on and turn-off of the fourth transistor; a first electrode of the fifth transistor is connected to the data driving circuit, a second electrode of the fifth transistor is connected to the third contact pad, and a gate of the fifth transistor is connected to a fifth switch signal terminal and is configured to receive a fifth switch signal to control turn-on and turn-off of the fifth transistor; the second control signal is configured to include the fourth switch signal and the fifth switch signal.

For example, in the driving circuit board provided by at least one embodiment of the present disclosure, the second selection switch includes a fourth transistor and a fifth transistor; a first electrode of the fourth transistor is connected to the touch detection circuit, a second electrode of the fourth transistor is connected to the third contact pad, and a gate of the fourth transistor is connected to a second control signal terminal to receive the second control signal; a first electrode of the fifth transistor is connected to the data driving circuit, a second electrode of the fifth transistor is connected to the third contact pad, and a gate of the fifth transistor is connected to the gate of the fourth transistor; wherein the fourth transistor is an N-type transistor, the fifth transistor is a P-type transistor, or the fourth transistor is an P-type transistor, the fifth transistor is a N-type transistor.

For example, in the driving circuit board provided by at least one embodiment of the present disclosure, the driving circuit board further comprises a fourth contact pad and a voltage signal circuit connected to the fourth contact pad, wherein the voltage signal circuit is configured to provide a voltage signal to the fourth contact pad.

For example, in the driving circuit board provided by at least one embodiment of the present disclosure, the driving circuit board further comprises: a plurality of second dummy selection switches and a plurality of second data contact pads; wherein, each second dummy selection switch is electrically connected to one second data contact pad and the data driving circuit, and is configured to receive the second control signal, and according to the second control signal, electrically connect a second data contact pad and the data driving circuit.

For example, in the driving circuit board provided by at least one embodiment of the present disclosure, the second dummy selection switch includes a third collocated transistor; wherein, a first electrode of the third collocated transistor is connected to the data driving circuit, a second electrode of the third collocated transistor is connected to the second data contact pad via a wiring, and a gate of the third collocated transistor is connected to a fifth switch signal terminal and is configured to receive a fifth switch signal, to control turn-on or turn-off of the third collocated transistor.

For example, in the driving circuit board provided by at least one embodiment of the present disclosure, the second dummy selection switch further includes a fourth collocated transistor, wherein, a first electrode of the fourth collocated transistor is in a floating state, a second electrode of the fourth collocated transistor is connected to the second data contact pad via a wiring, and a gate of the fourth collocated transistor is connected to a fourth switch signal terminal and is configured to receive a fourth switch signal, to control turn-on or turn-off of the fourth collocated transistor.

At least one embodiment of the present disclosure provides a touch display device, comprising: the touch display panel according to any embodiment of the present disclosure; and the driving circuit board according to any embodiment of the present disclosure; and the plurality of first contact pads and the plurality of third contact pads are electrically connected in an one-to-one correspondence manner.

For example, in the touch display device provided by at least one embodiment of the present disclosure, the touch display panel comprises a second contact pad connected to a common signal line to provide a voltage signal to the common signal line; the driving circuit board includes a fourth contact pad and a voltage signal circuit connected to the fourth contact pad, wherein the voltage signal circuit is configured to provide a voltage signal to the fourth contact pad; the second contact pad and the fourth contact pad are connected in an one-to-one manner.

For example, in the touch display device provided by at least one embodiment of the present disclosure, the touch display panel further comprises: a plurality of second data lines, a plurality of first dummy selection switches, and a plurality of first data contact pads; each first dummy selection switch is electrically connected to one first data contact pad and one second data line, and is configured to receive the first control signal, and electrically connect a first data contact pad and a second data line according to the first control signal; the plurality of first contact pads and the plurality of first data contact pads on the touch display panel are connected to the plurality of third contact pads on the driving circuit board in an one-to-one correspondence manner.

For example, in the touch display device provided by at least one embodiment of the present disclosure, the touch display panel further comprises: a plurality of second data lines, a plurality of first dummy selection switches, and a plurality of first data contact pads; each first dummy selection switch is electrically connected to one first data contact pad and one second data line, and is configured to receive the first control signal, and electrically connect a first data contact pad and a second data line according to the first control signal; and each second dummy selection switch is electrically connected to one second data contact pad and the data driving circuit, and is configured to receive a second control signal, and electrically connect the second data contact pad and the data driving circuit according to the second control signal; the plurality of first data contact pads and the plurality of second data contact pads are connected in an one-to-one correspondence manner.

At least one embodiment of the present disclosure provides a driving method for driving the touch display device according to any embodiment of the present disclosure, comprising: during a display phase, the first selection switch electrically connecting the first contact pad and the first data line in response to the first control signal, the second selection switch electrically connecting the third contact pad and the data driving circuit in response to the second control signal; and during a touch-control phase, the first selection switch electrically connecting the first contact pad and the touch-control line in response to the first control signal, the second selection switch connecting the third contact pad and the touch detection circuit in response to the second control signal.

For example, in the driving method provided by at least one embodiment of the present disclosure, in a case where the driving method comprises a common signal line, the driving method comprises: during the display phase, the common signal line providing a common voltage to the touch-control circuit array; and during the touch phase, the common signal line providing a touch-control signal to the touch-control circuit array.

BRIEF DESCRIPTION OF THE DRAWINGS

In order to more clearly illustrate the technical solution of the embodiments of the present disclosure, the drawings of the embodiments will be briefly described below, and it will be apparent that the drawings in the following description relate only to some embodiments of the present disclosure and are not limitations of the present disclosure.

DETAILED DESCRIPTION

Figure 1:
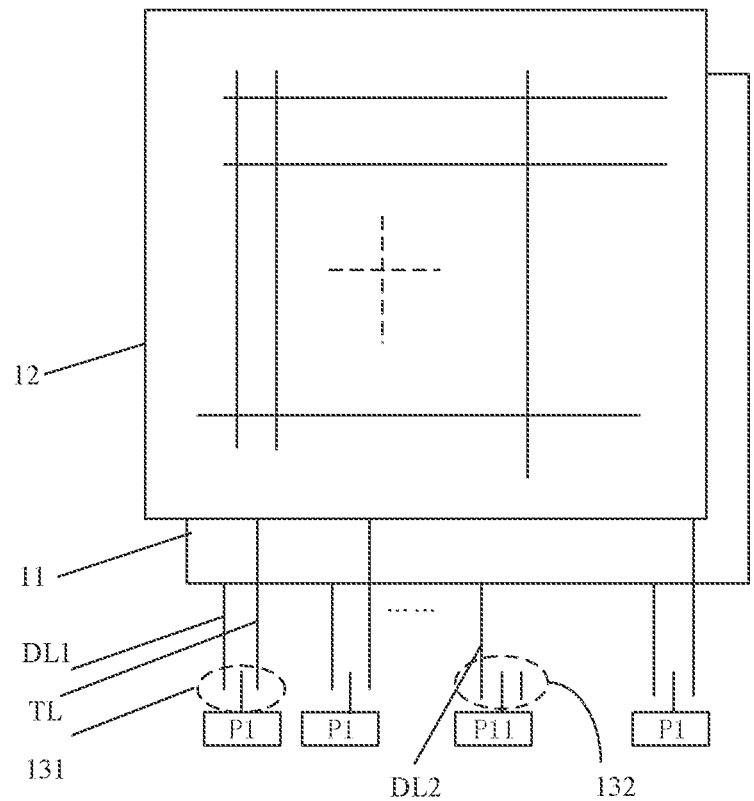
FIG. 1 is a schematic diagram of a touch display panel provided by at least one embodiment of the present disclosure.

In order to make objects, technical solutions and advantages of the embodiments of the disclosure apparent, the technical solutions of the embodiment of the disclosure will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s) without any inventive effort, which should be within the scope of the disclosure.

Unless otherwise defined, the technical terms or scientific terms here should be of general meaning as understood by those ordinarily skilled in the art. In the present disclosure, words such as "first", "second" and the like do not denote any order, quantity, or importance, but rather are used for distinguishing different components. Similarly, words such as "include" or "comprise" and the like denote that elements or objects appearing before the words of "include" or "comprise", or cover the elements or the objects enumerated or equivalents thereof after the words of "include" or "comprise", not excluding other elements or objects. Words such as "connected" or "connecting" and the like are not limited to physical or mechanical connections, but may include electrical connections, either direct or indirect. Words such as "up", "down", "left", "right", etc. are only used to indicate relative position relationships, when the absolute position of described objects changes, the relative position relationships may also be changed accordingly.

For example, liquid crystal display devices or organic light emitting diode (OLED) display devices include a variety of signal lines such as scanning lines, data lines, etc. In addition to the above-mentioned signal lines, the display device includes other types of lines, such as power lines, etc. The lines achieve electrical connection with a circuit board at least partially through a bonding method. At present, as functions of a display device increase, the number of lines of the display device also increases. For example, for a touch display device, in order to realize a touch-control function, the touch display device needs to configure corresponding touch-control lines to transmit touch signals. The touch-control lines are electrically connected to a touch-control chip also by way of bonding, for example. For example, for a 6.5" (6.5 inches) mobile phone product, numbers of data lines and touch-control lines are shown in Table 1.

TABLE 1

| Resolution | Data line | Touch-control line | Number of lines |
|---|---|---|---|
| 720*1280 (HD) | 2160 (mux1:1) | 648 | 2808 |
| 1440*2560 (QHD) | 1440 (mux1:3) | 648 | 2088 |
| 2160*3840 (UHD) | 2160 (mux1:3) | 648 | 2808 |

For example, in the above table, mux1:1 indicates that one sub-pixel corresponds to one data line, so that in a case where each pixel unit includes a red sub-pixel R, a green sub-pixel G, and a blue sub-pixel B, and RGB sub-pixels of pixel units in a same column are connected to 3 data lines, respectively, 720 columns of pixel units corresponds to 2160 data lines. Mux1:3 indicates that three sub-pixels are controlled by a switch so as to correspond to one data line, i.e., three sub-pixels in one pixel unit correspond to one data line, so that 1440 column of pixel units correspond to 1440 data lines.

Table 1 shows that the number of lines is increased by more than 20 percent for each connection method, compared to a stand-alone display device.

In COF (Chip On Flex or Chip On Film) products, respective lines are connected to the driving circuit board via corresponding contact pads in bonding regions, so that as the number of lines increases, the number of contact pads correspondingly increases. Therefore, pad pitches between the contact pads correspondingly reduce in case that the size of the display substrate remains unchanged. Corresponding to the reduction of the pad pitches, pitches between the contact pads or pins on the circuit board or driver chip which bond with these contact pads also need to be reduced accordingly. For example, when the resolution of the display device is 3240*3240, the relationship between the pad pitches and the number of lines is shown in Table 2.

TABLE 2

| Resolution | Data line | Touch-control line | Number of lines | Pad pitch |
|---|---|---|---|---|
| 3240*3240 | 3240 (mux 1:3) | 648 | 3888 | 8.5 um |
| 3240*3240 | 3240 (mux 1:3) | — | 3240 | 10 um |

As can be seen in Table 2, in products with higher resolution (e.g., 3K or 4K), due to increased number of lines on the panel, the number of contact pads on a driver IC (Integrated Circuit) increases accordingly, and the pad pitches on the driver IC (Integrated Circuit) become too small, which is difficult to be implemented through current IC packaging process or for which a yield becomes lower. Therefore, how to reduce the number of contact pads on display devices (e.g., driving circuit boards and display panels) has become an urgent problem to be solved.

To solve the above problem, at least one embodiment of the present disclosure provides a touch display panel comprising: a plurality of first data lines; a plurality of touch-control lines; a plurality of first contact pads; a plurality of first selection switches connected to the plurality of first contact pads in a one-to-one correspondence manner. Each first selection switch is electrically connected to one first contact pad, one first data line, and one touch-control line, and the first selection switch is configured to receive a first control signal and, according to the first control signal, electrically connect a first contact pad to a first data line during a first time period, electrically connect the first contact pad to a touch-control line during a second time period, and the first time period and the second time period do not overlap.

Some embodiments of the present disclosure further provide a driving circuit board, touch display device, and driving method corresponding to the touch display panel described above.

The touch display panel provided by the above embodiments of the present disclosure enables one first data line and one touch-control line to share one contact pad, so that the number of contact pads can be reduced and thus the pad pitches can be increased, which is advantageous to the realization of high-resolution display.

Embodiments of the present disclosure and examples thereof are described in detail below with reference to the accompanying drawings.

FIG. 1 is a schematic diagram of the touch display panel provided by at least one embodiment of the present disclosure. The touch display panel provided by at least one embodiment of the present disclosure is described in detail below with reference to FIG. 1.

As shown in FIG. 1, the touch display panel 10 includes: a display circuit array 11, a touch-control circuit array 12, a plurality of first contact pads P1 and a plurality of first selection switches 131. For example, the display circuit array 11 is used to implement display operations, and includes signal lines such as a plurality of first data lines DL1. The plurality of first data lines DL1 are provided to transmit data signals. The touch-control circuit array 12 is used to enable touch-control operations and includes a plurality of touch-control lines TL to transmit touch-control signals (e.g., touch-control sensing signals). Each first contact pad P1 is used to bond with a corresponding contact pad on the driving circuit board (e.g. referring to FIG. 7) to implement an electrical connection, so that a data driving circuit and a touch detection circuit included in the driving circuit board can be electrically connected to the plurality of first contact pads P1, respectively, so that the touch display panel 10 and the driving circuit board may transmit electrical signals between each other.

For example, the first selection switch 131 is electrically connected to one first contact pad P1, one first data line DL1 and one touch-control line TL and configured to receive a first control signal and, according to the first control signal, to electrically connect the first contact pad P1 and the first data line DL1 during a first time period, and to electrically connect the first contact pad P1 to the touch-control line TL during a second time period. The first time period and the second time period do not overlap, in order to achieve time-sharing multiplexing for the first contact pad P1. For example, the first time period is a display phase, and the second time period is a touch-control phase. For example, during the display phase, in response to the first control signal, the first selection switch 131 electrically connects the first contact pad P1 and the first data line DL1, so that a data signal provided by the data driving circuit on the driving circuit board is transmitted via the first contact pad P1 and the first data line DL1 to a pixel unit in the display circuit array 11, in order to drive the pixel unit to emit light according to corresponding data signal (e.g., grayscale voltage data); in the touch-control phase, in response to the first control signal, the first selection switch 131 electrically connects the first contact pad P1 to the touch-control line TL so that a touch signal generated in the touch-control circuit array 12 (e.g., the touch-sensing signal) is transmitted via the touch-control line TL and the first contact pad P1 to the touch detection circuit on the driving circuit board, in order to determine, for example, a touch position of a finger or a stylus on the touch display panel according to the touch signal (e.g., capacitance variation data), thereby realizing a touch-control function.

Thus, in this embodiment, by controlling a switch position of the first selection switch 131, the touch-control line and first data line can be connected to the same first contact pad in different phases, thereby reducing the number of first contact pads and increasing the pad pitches.

Figure 2A:
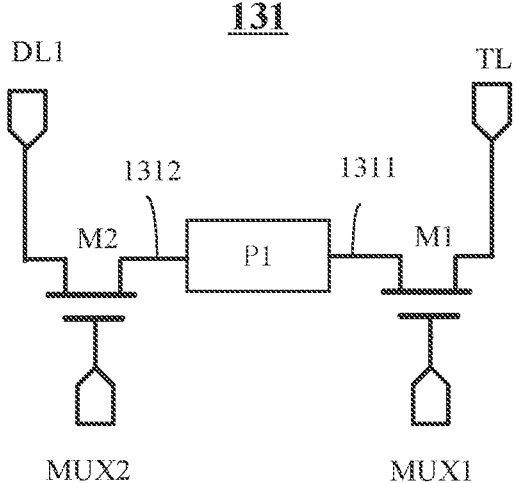
FIG. 2A is a schematic circuit diagram of an implementation example of a first selection switch shown in FIG. 1.

FIG. 2A is a schematic circuit diagram of an implementation example of the first selection switch shown in FIG. 1. As shown in FIG. 2A, this first selection switch 131 includes a first transistor M1 and a second transistor M2. It should be noted that the transistors shown in FIG. 2A are all illustrated as N-type transistors. The embodiments of the present disclosure are not limited thereto, and the transistors may also be P-type transistors.

For example, the first electrode of the first transistor M1 is connected to the touch-control line TL, the second electrode of the first transistor M1 is connected to the first contact pad P1 via a wiring 1311, and the gate of the first transistor M1 is connected to a first switch signal terminal MUX1 to receive a first switch signal. For example, the first transistor M1 is turned on in response to the first switch signal, and causes the touch-control line TL and the first contact pad P1 to be connected, so that the touch-control signal transmitted by the touch-control line TL is transmitted to the first contact pad P1.

The first electrode of the second transistor M2 is connected to the first data line DL1, the second electrode of the second transistor M2 is connected to the first contact pad P1 via a wiring, and the gate of the second transistor M2 is connected to a second switch signal terminal MUX2 to receive a second switch signal. For example, the second transistor M2 is turned on in response to the second switch signal, and causes the first data line DL1 and the first contact pad P1 to be connected, so that the data signal transmitted to the first contact pad P1 is transmitted to the first data line DL1, and is transmitted to a pixel unit in the display circuit array 11 to drive the pixel unit to emit light.

For example, in this example, the first control signal includes the first switch signal and the second switch signal.

Figure 2B:
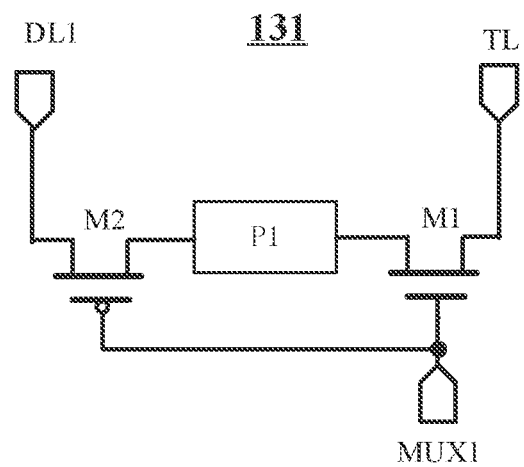
FIG. 2B is a schematic circuit diagram of another implementation example of the first selection switch provided by some embodiments of the present disclosure.
Figure 2C:
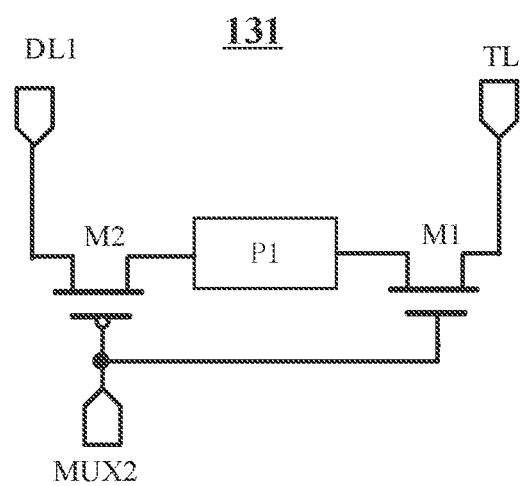
FIG. 2C is a schematic circuit diagram of yet another implementation example of the first selection switch provided by some embodiments of the present disclosure.

For example, when the first transistor M1 and the second transistor M2 are of the same type (as shown in FIG. 2A, the first transistor M1 and the second transistor M2 are both N-type transistors, although they can both be P-type transistors, and the embodiments of the present disclosure are not limited thereto), the first switch signal and the second switch signal are different signals. For example, one is of high level with respect to a reference level, and the other is of low level with respect to the reference level. When the first transistor M1 and the second transistor M2 are of different types (as shown in FIG. 2B or FIG. 2C, the first transistor M1 is an N-type transistor and the second transistor M2 is a P-type transistor; and of course, the first transistor M1 can be a P type transistor, and the second transistor M2 is an N-type transistor), the first switch signal and second switch signal are the same signal. For example, the first switch signal and second switch signal are both of high level or low level with respect to the reference level. Embodiments of the present disclosure are not limited thereto.

For example, in other examples, when the first transistor M1 and the second transistor M2 are of different types, the two transistors can be controlled to switch on or off by one switch signal. FIG. 2B is a schematic circuit diagram of another implementation example of the first selection switch provided by some embodiments of the present disclosure. FIG. 2C is a schematic circuit diagram of yet another implementation example of the first selection switch provided by some embodiments of the present disclosure. It should be noted that in FIGS. 2B and 2C, it is taken as an example that the first transistor M1 is an N-type transistor and the second transistor M2 is a P-type transistor. The embodiments of the present disclosure are not limited thereto. Also, the first transistor M1 may be a P-type transistor and the second transistor M2 may be an N-type transistor.

For example, as shown in FIG. 2B, the circuit structure of the first selection switch shown in FIG. 2B is substantially the same as that of the first selection switch shown in FIG. 2A, with the difference that the gate of the second transistor M2 is connected to the gate of the first transistor M1, i.e., to the first switch signal terminal MUX1, to be turned on or off under the control of the first switch signal provided by the first switch signal terminal MUX1.

Of course, the gate of the second transistor M2 and the gate of the first transistor M1 may also both be connected to the second switch signal terminal MUX2 (as shown in FIG. 2C), to be turned on or off under the control of the second switch signal provided by the second switch signal terminal MUX2, and the embodiments of the present disclosure are not limited thereto.

For example, in the example shown in FIG. 2B or FIG. 2C, the first control signal terminal is the first switch signal terminal MUX1 or the second switch signal terminal MUX2, and the first control signal is the first switch signal or the second switch signal, and the embodiments of the present disclosure are not limited thereto.

In the embodiments of the present disclosure, by means of this first selection switch, the first contact pad can be controlled to connect to different lines during different time periods, so that a plurality of lines may share one first contact pad, which can effectively reduce the number of first contact pads. Because the third contact pads on the driving circuit board and the first contact pads on the touch display panel are connected in an one-to-one correspondence manner, the number of third contact pads on the driving circuit board can also be effectively reduced, which can increase the pad pitches and reduce the difficulty of implementing the bonding process, thereby improving the yield of the products, and reducing manufacturing costs.

For example, as shown in Tables 1 and 2 above, in some examples, because the number of touch-control lines is less than the number of first data lines, the touch-control lines TL shares only a part of the contact pads with the first data lines DL1 in the touch display panel. For example, the part of the contact pads are the first contact pads P1. Another part of the contact pads are only connected to the second data lines DL2. For example, the other part of the contact pads are first data contact pads P11 shown in FIG. 1.

For example, in some examples, because the first data contact pads P11 are not connected to the touch-control lines TL, it is possible to directly connect the second data lines DL2 to the first data contact pads P11.

For example, as shown in FIG. 1, in other examples, the touch display panel 10 further includes a plurality of first dummy selection switches 132.

For example, each first dummy selection switch 132 is electrically connected to one first data contact pad P11 and one second data line DL2, and is configured to receive the first control signal and, according to the first control signal, electrically connect the first data contact pad P11 and the second data line DL2.

Figure 3:
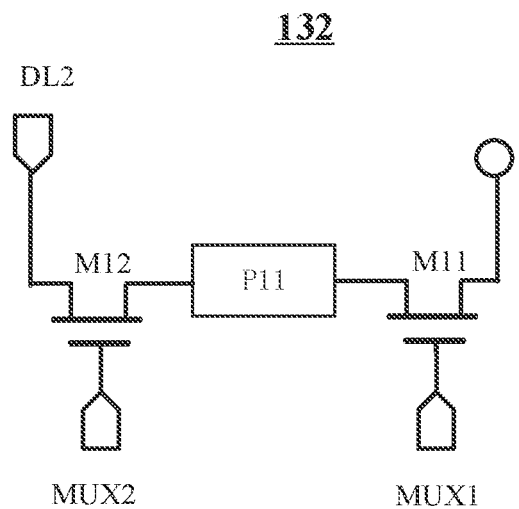
FIG. 3 is a schematic circuit diagram of an implementation example of a first dummy selection switch shown in FIG. 1.

FIG. 3 is a schematic circuit diagram of an implementation example of the first dummy selection switch 132 shown in FIG. 1. As shown in FIG. 3, the first dummy selection switch 132 includes a first collocated transistor M11 and a second collocated transistor M12.

For example, the first electrode of the first collocated transistor M11 is in a floating state (e.g., a state where the first collocated transistor M11 is not connected to any signal lines), the second electrode of the first collocated transistor M11 is connected to the first data contact pad P11, and the gate of the first collocated transistor M11 is connected to the first switch signal terminal MUX1 to receive the first switch signal. The first electrode of the second collocated transistor M12 is connected to the second data line DL2, the second electrode of the second collocated transistor M12 is connected to the first data contact pad P11, and the gate of the second collocated transistor M12 is connected to the second switch signal terminal MUX2 to receive the second switch signal.

It should be noted that the first collocated transistor M11 and the second collocated transistor M12 may also have the same types, connection manners and operation principles as those of the first transistor M1 and the second transistor M2 as shown in FIG. 2B or FIG. 2C, i.e., when the type of the first collocated transistor M11 and the type of the second collocated transistor M12 are different, the gate of the first collocated transistor M11 and the gate of the second collocated transistor M12 may both be connected to the first control signal terminal (e.g., the first switch signal terminal or the second switch signal terminal), which will not be repeated herein.

For example, by setting the first dummy selection switch 132 having the same structure as that of the first selection switch 131 at the first data contact pad, the load connected to each first data contact pad P11 and the load connected to each first contact pad P1 may be the same, so the impact on the data signals or the touch-control signals due to the difference between the loads connected to each contact pad can be avoided, thereby improving touch-control accuracy and display quality of the touch display panel.

Another specific implementation example of the first dummy selection switch 132 includes only the first collocated transistor M11 without including the second collocated transistor M12.

Figure 4A:
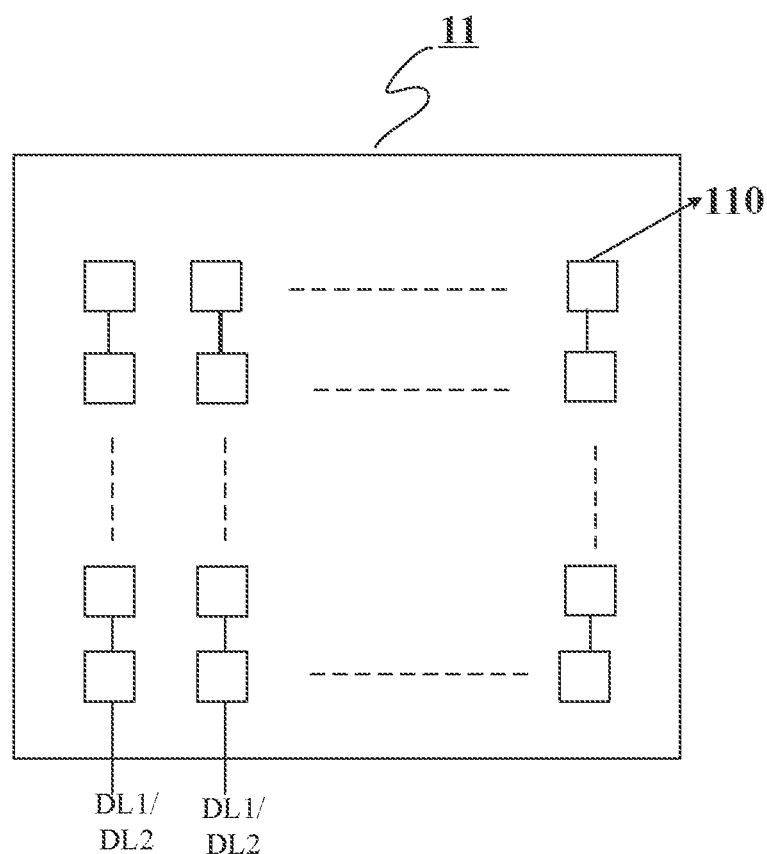
FIG. 4A is a schematic diagram of a display circuit array provided by at least one embodiment of the present disclosure.
Figure 4B:
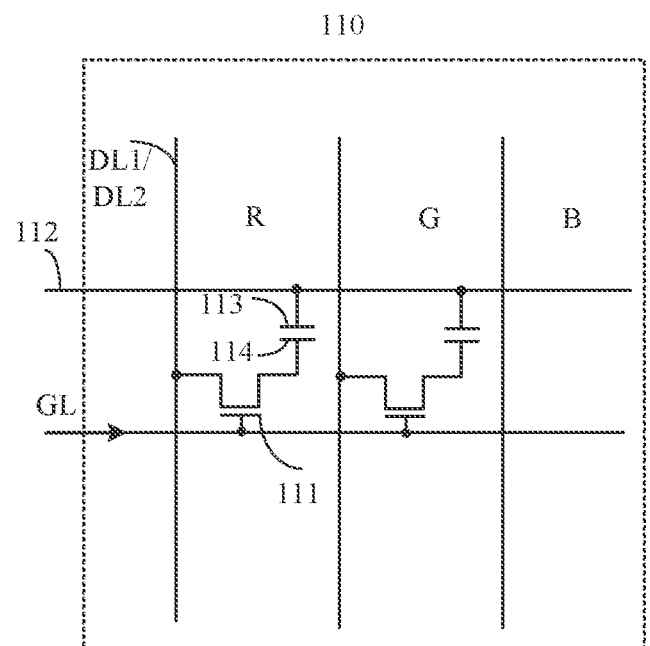
FIG. 4B is a schematic diagram of an example of a pixel unit shown in FIG. 4A.

FIG. 4A is a schematic diagram of a display circuit array provided by at least one embodiment of the present disclosure, and FIG. 4B is a schematic diagram of an example of a pixel unit shown in FIG. 4A. It should be noted that the pixel unit shown in FIG. 4B takes a pixel unit used in a liquid crystal display panel as an example, while the embodiments of the present disclosure are not limited thereto. The pixel unit may also employ a pixel unit used in an organic light emitting diode display panel, and details are not described herein. The display circuit array provided by the present disclosure is described in detail below with reference to FIGS. 4A and 4B.

As shown in FIG. 4A, the display circuit array 11 includes a plurality of columns of pixel units 110. Each column of pixel units 110 are connected to a same first data line DL1 to receive a data signal.

As shown in FIG. 4B, each pixel unit 110 includes red, green, and blue (RGB) sub-pixels located in a same row, and sub-pixels in each column are connected to a same data line DL1 or a same second data line DL2. Each sub-pixel includes at least one thin film transistor 111, pixel electrode 114 and common electrode 113. The thin film transistor 111 acts as a switch element, and includes a gate, a source and a drain, and the gate, the source and the drain are respectively connected to a gate line GL, the first data line DL1/the second data line DL2 and the pixel electrode 114. The pixel electrode 114 and the common electrode 113 form a capacitor. For example, the common electrode 113 is connected to a common electrode line 112 to receive a common voltage, and the thin film transistor 111 is turned on under the control of a gate scanning signal on the gate line GL, in order to apply the data signal on the first data line DL1 or the second data line DL2 to the pixel electrode 114, to charge the capacitor formed by the pixel electrode 114 and the common electrode 113, thereby forming an electric field to control deflections of liquid crystal molecules.

Figure 5A:
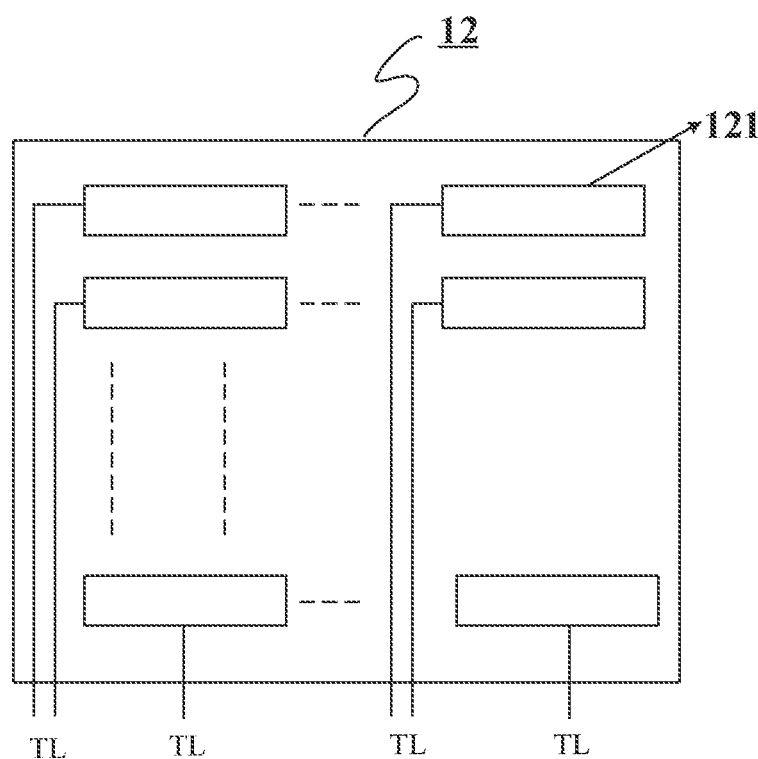
FIG. 5A is a schematic diagram of a touch-control circuit array provided by at least one embodiment of the present disclosure.
Figure 5B:
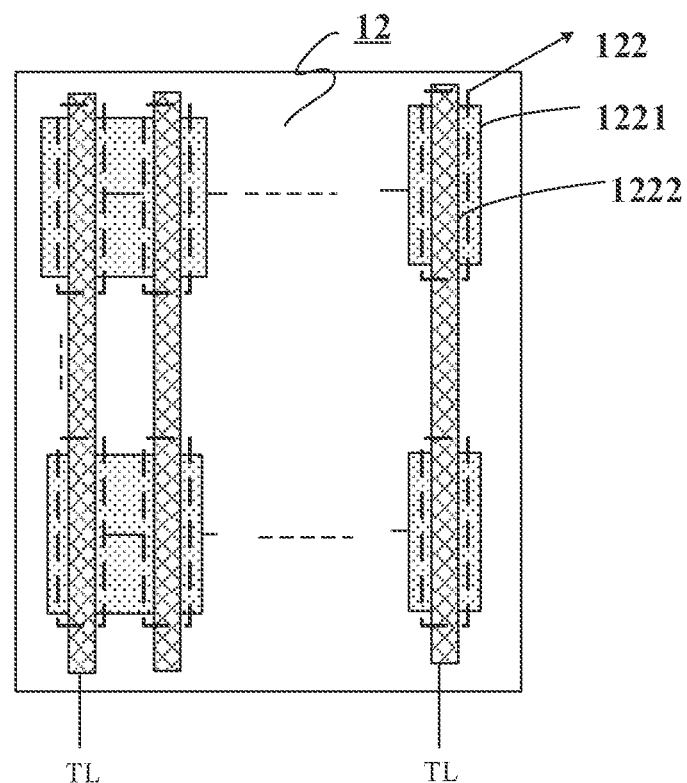
FIG. 5B is a schematic diagram of another touch-control circuit array provided by at least one embodiment of the present disclosure.

FIG. 5A is a schematic diagram of a touch-control circuit array provided by at least one embodiment of the present disclosure, and FIG. 5B is a schematic diagram of anotherthe touch-control circuit array provided by at least one embodiment of the present disclosure. The touch-control circuit array provided by the embodiments of the present disclosure are described in detail below with reference to FIGS. 5A and 5B.

For example, in some examples, as shown in FIG. 5A, the touch-control circuit array 12 includes a plurality of first touch-control electrodes 121. Each of the first touch-control electrodes 121 is connected to one touch-control line TL. For example, in this example, the plurality of first touch-control electrodes 121 are self-capacitive electrodes to implement a touch-control. For example, a touch sensing signal generated by each first touch-control electrode is transmitted via the touch-control line TL connected to the touch detection circuit on the driving circuit board.

For example, in some embodiments of the present disclosure, the first touch-control electrode 121 may be multiplexed as the common electrode 113 shown in FIG. 4B.

It should be noted that in other examples, the touch-control circuit array may further include touch sensors that each forms a mutual capacitor to implement the touch detection, and the embodiments of the present disclosure do not limited thereto.

For example, in this example, as shown in FIG. 5B, the touch-control circuit array 12 includes a plurality of touch sensors 122 arranged in an array. Each touch sensor 122 includes a first touch-control electrode 1221 and a second touch-control electrode 1222. The second touch-control electrodes 1222 of touch sensors 122 in each column are connected to the same touch-control line TL. For example, the first touch-control electrode 1221 is a touch-control driving electrode, for example, to receive a touch-control driving signal. The second touch-control electrode 1222 is a touch-control sensing electrode, for example, to receive a touch-control sensing signal and transmit this touch-control sensing signal to the touch detection circuit via the touch-control line TL. Of course, in other examples, the first touch-control electrode 1221 is the touch-control sensing electrode and the second touch-control electrode 1222 is the touch-control driving electrode, the embodiments of the present disclosure are not limited thereto. For example, in some embodiments, the first touch-control electrode 1221 is identical to the first touch-control electrode 121 as shown in FIG. 5A.

For example, in some embodiments of the present disclosure, the display circuit array includes common electrodes, and the first touch-control electrodes 1221 may be multiplexed as the common electrodes shown in FIG. 4B, and are configured to receive the common voltage.

Figure 6A:
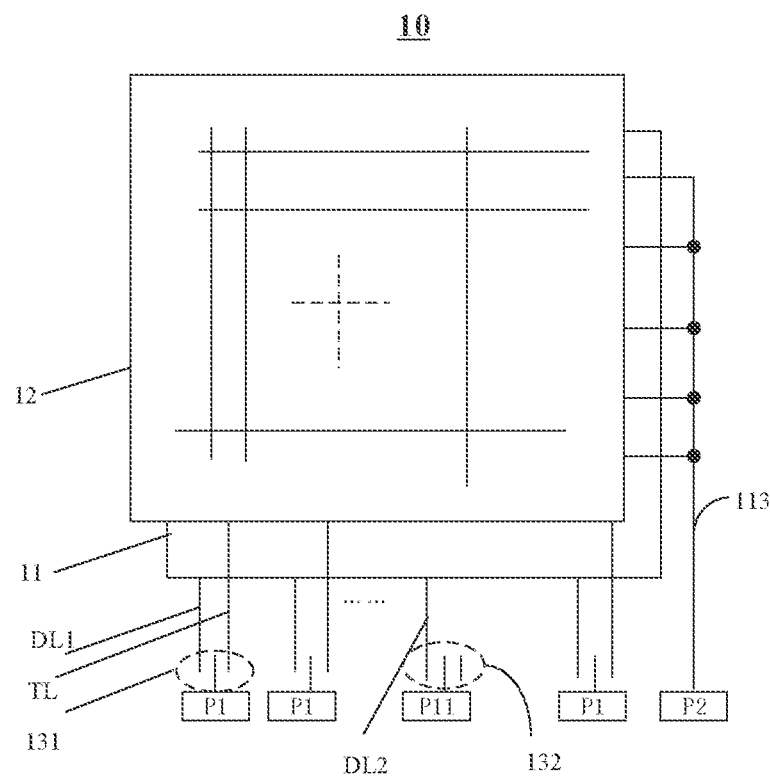
FIG. 6A is a schematic diagram of another touch display panel provided by at least one embodiment of the present disclosure.
Figure 6B:
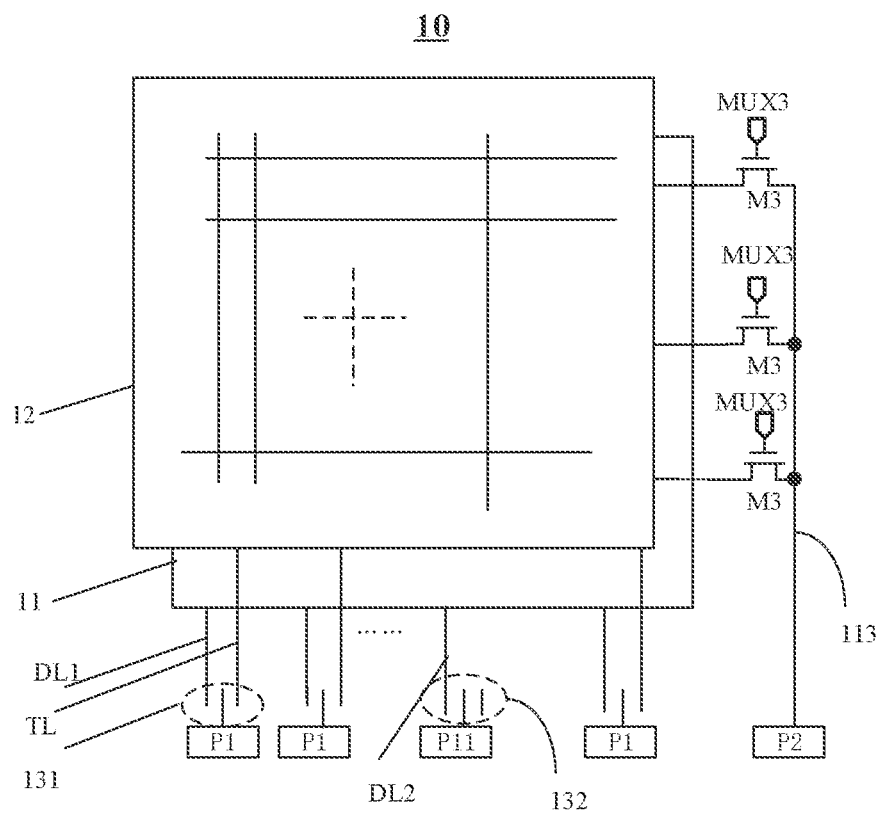
FIG. 6B is a schematic diagram of yet another touch display panel provided by at least one embodiment of the present disclosure.

FIG. 6A is a schematic diagram of another touch display panel provided by at least one embodiment of the disclosure, and FIG. 6B is a schematic diagram of yet another touch display panel provided by at least one embodiment of the disclosure.

For example, in some examples, as shown in FIG. 6A, in the example shown in FIG. 1, the touch display panel 10 further includes a common signal line 113. For example, the common signal line 113 is connected to the first touch-control electrodes. For example, the common signal line 113 is connected to the first touch-control electrodes 121 shown in FIG. 5A, or is connected to first touch-control electrodes 1221 in the touch sensor 122 shown in FIG. 5B.

In this embodiment, for example, the first touch-control electrode 121 or the first touch-control electrode 1221 can be multiplexed by driving the touch display panel in a manner of time-sharing.

In this example, since the first touch-control electrodes 121 or the first touch-control electrodes 1221 are multiplexed as the common electrodes (as shown in FIG. 4B) for the display circuit array 11, during the display phase, the common signal line 113 provides the common voltage for display to the first touch-control electrodes 121 or the first touch-control electrodes 1221, to enable the first touch-control electrodes 121 or the first touch-control electrodes 1221 to act as the common electrodes in this phase to drive pixel units to emit light. In the touch-control phase, the touch-control driving signal is provided to the first touch-control electrodes 121 or the first touch-control electrodes 1221 to enable touch detection.

For example, in other examples, the touch display panel 10 further includes a second contact pad P2. For example, the second contact pad P2 is connected to the common signal line 113 to provide a voltage signal to the common signal line 113. For example, the voltage signal is used as a signal for providing the common voltage in the display phase and used as the touch driving signal in the touch-control phase, the embodiments of the present disclosure are no limited thereto.

For example, as shown in FIG. 6B, on the basis of the example shown in FIG. 6A, each first selection switch 131 further includes a third transistor M3. For example, the first electrode of the third transistor M3 is connected to the common signal line 113, the second electrode of the third transistor M3 is connected to one first touch-control electrode 121/1221, and the gate of the third transistor M3 is connected to a third switch signal terminal MUX3, to receive a third switch signal. For example, the third transistor M3 is turned on under the control of the third switch signal, so that the common signal line 113 is connected to the first touch-control electrodes 121/1221, to provide the signal for providing the common voltage or the touch driving signal to the first touch-control electrodes 121/1221. For example, during the display phase, the third transistors M3 in respective rows may be simultaneously turned on to transmit the signal for providing the common voltage provided by the common signal line 113 to the touch-control circuit array.

For example, in the touch-control phase, when the touch-control circuit array 12 is of the structure shown in FIG. 5B, i.e., when the touch detection is performed based on the mutual capacitance, the third transistors M3 may be turned on line by line so that the touch-control driving signal on the common signal line 113 is input to the touch-control circuit array line by line, in order to achieve a scanning of the touch display panel line by line, thereby realizing the touch-control function.

For example, in the touch-control phase, when the touch-control circuit array 12 is of the structure shown in FIG. 5A, i.e., when the touch detection is performed based on the self-capacitance, it is possible to use the structure shown in FIG. 6A, i.e., it is possible to simultaneously apply the touch-control driving signal to the first touch-control electrodes 121 via the common signal line 113. At the same time, each first touch-control electrode 121 transmits the touch-control sensing signal generated by the first touch-control electrode 121 via the touch-control line TL connected thereto, respectively, to the touch detection circuit. Of course, for example, the structure shown in FIG. 6B can also be adopted, such that the third transistors M3 in respective rows are simultaneously turned on to apply the touch-control driving signal to all of the first touch-control electrodes 121 simultaneously.

At least one embodiment of the present disclosure also provides a driving circuit board used in the touch display panel, the driving circuit board is integrated in the bonding region of the touch display device and connected correspondingly to the touch display panel 10, to provide corresponding driving signals (e.g., the data signal, the gate scanning signal, the touch-control driving signal, the signal for providing the common voltage, and the signal for providing other supply voltages, etc.) to the touch display panel 10.

Figure 7:
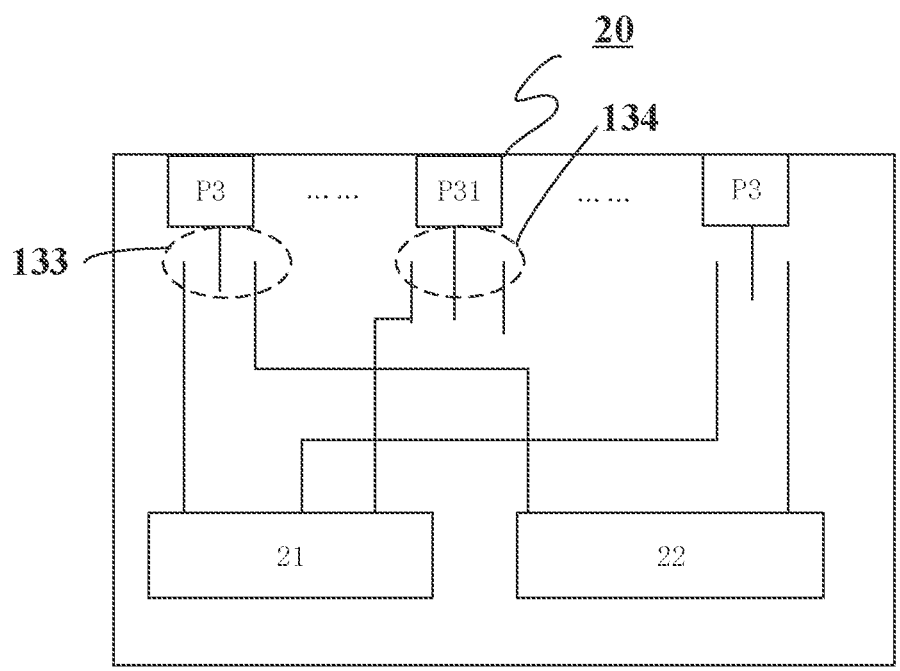
FIG. 7 is a schematic diagram of a driving circuit board provided by at least one embodiment of the present disclosure.

FIG. 7 is a schematic diagram of a driving circuit board provided by at least one embodiment of the present disclosure. As shown in FIG. 7, the driving circuit board 20 includes a data driving circuit 21, a touch detection circuit 22, a plurality of third contact pads P3 and a plurality of second selection switches 133. For example, the plurality of second selection switches 133 are connected to the plurality of third contact pads P3 in an one-to-one correspondence manner. For example, each second selection switch 133 is electrically connected to one third contact pad P3, the touch detection circuit 22, and the data driving circuit 21, and is configured to receive a second control signal, and based on the second control signal, the third contact pad P3 and the data driving circuit 21 are electrically connected during a first time period. Also, the third contact pad P3 is electrically connected to the touch detection circuit 22 during a second time period. The first time period and the second time period do not overlap. The driving circuit board 20 is bonded with the first contact pads P1 of the touch display panel 10 shown in FIG. 1, for example, via the third contact pads P3 to establish an electrical connection, so that the touch display panel 10 and the driving circuit board can transmit electrical signals to each other.

For example, the data driving circuit 21 and the touch detection circuit 22 may be prepared directly on the substrate of the driving circuit board 20, or realized as an integrated circuit chip mounted on the substrate of the driving circuit board 20 in an appropriate manner (e.g., bonding) and electrically connected to the lines on the substrate, and thus connected with the third contact pads P3.

For example, during the display phase, the second selection switch 133 is turned on in response to the second control signal, causing the data driving circuit 21 to be connected to the third contact pad P3, thereby transmitting the data signal generated by the data driving circuit 21 to the third contact pad P3. During the touch-control phase, the second selection switch 133 is turned on in response to the second control signal, causing the touch detection circuit 22 to connect to the third contact pad P3, thereby transmitting the touch sensing signal received by the third contact pad P3 from the touch display panel 10 to the touch detection circuit to so that the touch detection circuit determines touch positions, for example, the touch position of a finger, stylus, etc., on the touch display panel, according to the capacitance changes derived from the touch sensing signal. Thus, in this embodiment, by controlling the on/off time of the second selection switch 132, the touch detection circuit and the data driving circuit are connected to the same third contact pad during different phases, respectively, thus reducing the number of third contact pads on the driving circuit board, increasing the pad pitches, reducing the difficulty of the bonding process, improving the yield of products, and reducing manufacturing costs, which is advantageous for the realization of the high resolution display.

Figure 8A:
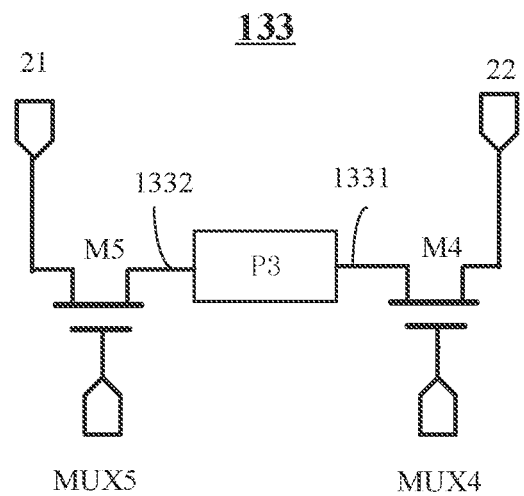
FIG. 8A is a schematic circuit diagram of an implementation example of a second selection switch circuit shown in FIG. 7.

FIG. 8A is a schematic circuit diagram of an implementation example of the second selection switch shown in FIG. 7. As shown in FIG. 8A, the second selection switch 133 includes a fourth transistor M4 and a fifth transistor M5. It should be noted that the transistors shown in FIG. 8A are all illustrated as N-type transistors, for example, and the embodiments of the present disclosure are not limited thereto, the transistors may also be P-type transistors, of course.

For example, the first electrode of the fourth transistor M4 is connected to the touch detection circuit 22, and the second electrode of the fourth transistor M4 is connected to the third contact pad P3 via a wiring 1331, and the gate of the fourth transistor M4 is connected to a fourth switch signal terminal MUX4 to receive a fourth switch signal. For example, in some examples, the fourth transistor M4 is turned on in response to the fourth switch signal, causing the touch detection circuit 22 to be connected to the third contact pad P3 so that the touch sensing signal received by the third contact pad P3 from the touch display panel 10 is transmitted to the touch detection circuit.

For example, the first electrode of the fifth transistor M5 is connected to the data driving circuit 21, and the second electrode of the fifth transistor M5 is connected to the third contact pad P3 via a wiring 1332, and the gate of the fifth transistor M5 is connected to a fifth switch signal terminal MUX5 to receive a fifth switch signal. For example, the fifth transistor M5 is turned on in response to the fifth switch signal, causing the data driving circuit 21 to be connected to the third contact pad P3, so that the data signal generated by the data driving circuit 21 is transmitted to the third contact pad P3.

For example, the second control signal includes the fourth switch signal and the fifth switch signal.

Figure 8B:
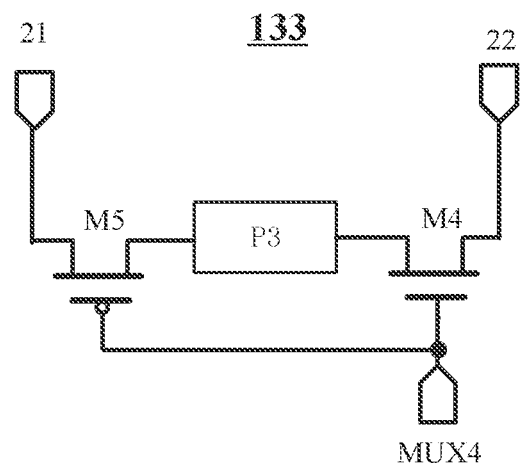
FIG. 8B is a schematic circuit diagram of another implementation example of the second selection switch provided by at least one embodiment of the present disclosure.
Figure 8C:
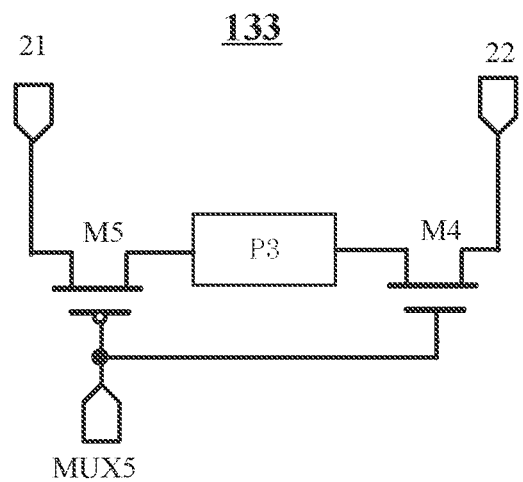
FIG. 8C is a schematic circuit diagram of yet another implementation example of the second selection switch provided by at least one embodiment of the present disclosure.

For example, when the fourth transistor M4 and the fifth transistor M5 are of the same type (as shown in FIG. 8A), the fourth switch signal and the fifth switch signal are different signals. For example, one is of high level, and the other is of low level. when the fourth transistor M4 and fifth The transistor M5 are of different types (as shown in FIG. 8B or FIG. 8C), the fourth switch signal and the fifth switch signal are the same signal, e.g., both of high level or both of low level. The embodiments of the present disclosure are not limited thereto.

For example, in other examples, when the fourth transistor M4 and the fifth transistor M5 are of different types, one switch signal (e.g., the second control signal) can be used to control the on/off of the two transistors. FIG. 8B is a schematic circuit diagram of another implementation example of the second selection switch provided by some embodiments of the disclosure. FIG. 8C is a schematic circuit diagram of another implementation example of the second selection switch provided by some embodiments of the disclosure. It should be noted that in FIG. 8B and FIG. 8C, illustrations are provided by taking that the fourth transistor M4 is an N-type transistor and the fifth transistor M5 is a P-type transistor as an example, and the embodiments of the present disclosure are not limited thereto. The fourth transistor M4 may also be a P-type transistor and the fifth transistor M5 may also be an N-type transistor.

For example, as shown in FIG. 8B, the circuit structure of the second selection switch shown in FIG. 8B is substantially the same as the circuit structure of the second selection switch shown in FIG. 8A, with a difference that the gate of the fourth transistor M4 is connected to the gate of the fifth transistor M5, i.e., to the fourth switch signal terminal MUX4, so that the fourth transistor M4 is turned on or off under the control of the fourth switch signal provided by the fourth switch signal terminal MUX4.

Of course, the gate of the fourth transistor M4 and the gate of the fifth transistor M5 may also both be connected to the fifth switch signal terminal MUX5 (as shown in FIG. 8C), so that the fourth transistor M4 is turned on or off under the control of the fifth switch signal provided by the fifth switch signal terminal MUX5, and the embodiments of the present disclosure are not limited thereto.

For example, in this example, the fourth switch signal terminal MUX4 or the fifth switch signal terminal MUX5 may be used as the second control signal terminal, with the fourth switch signal and the fifth switch signal serving as the second control signal.

For example, in this example, the fourth transistor M4 is an N-type transistor and the fifth transistor M5 is a P-type transistor or the fourth transistor M4 is a P-type transistor and the fifth transistor M5 is an N-type transistor. The embodiments of the present disclosure are not limited thereto.

As shown in FIG. 7, the driving circuit board 20 further includes a plurality of second dummy selection switches 134 and a plurality of second data contact pads P31. Each second dummy selection switch 134 is electrically connected to one second data contact pad P31 and the data driving circuit 21, and is configured to receive the second control signal, and electrically connecting the second data contact pad P31 and the data driving circuit 21 according to the second control signal.

Figure 8D:
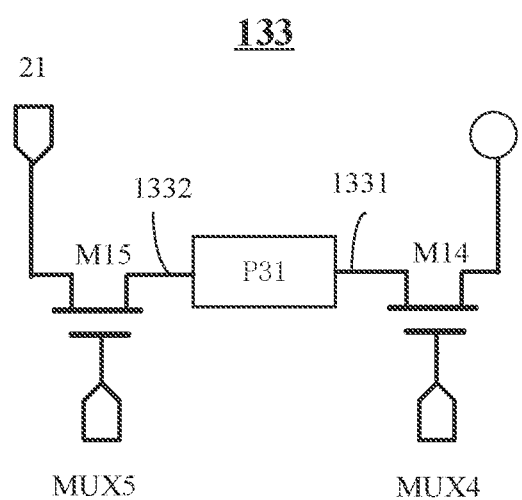
FIG. 8D is a schematic circuit diagram of a second dummy selection switch provided by at least one embodiment of the present disclosure.

FIG. 8D is a schematic circuit diagram of the second dummy selection switch provided by at least one embodiment of the present disclosure. As shown in FIG. 8D, the second dummy selection switch includes a third collocated transistor M15 and a fourth collocated transistor M14. The first electrode of the third collocated transistor M15 is connected to the data driving circuit 21, and the second electrode of the third collocated transistor M15 is connected to the second data contact pad P31 via the wiring 1332, the gate of the third collocated transistor M15 is connected to the fifth switch signal terminal MUX5 to receive the fifth switch signal.

The first electrode of the fourth collocated transistor M14 is in a float state, the second electrode of the fourth collocated transistor M14 is connected to the second data contact pad P31 via the wiring 1331, and the gate of the fourth dummy transistor M14 is connected to the fourth switch signal terminal MUX4 to receive the fourth switch signal.

It should be noted that the second dummy selection switch may include only the third collocated transistor M15, and the embodiments of the present disclosure are not limited thereto.

The connection structure of the second dummy selection switch is not limited thereto, and may also be similar to the connection structure of the respective transistors in the second selection switch shown in FIGS. 8B and 8C, which will not be described in detail herein.

Figure 9:
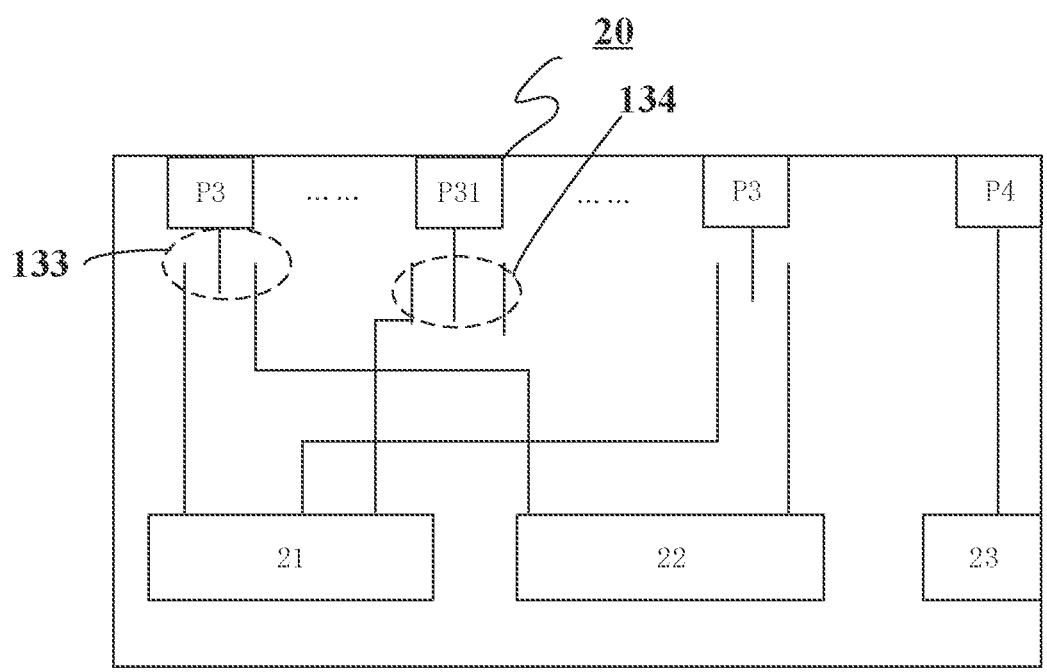
FIG. 9 is a schematic diagram of another driving circuit board provided by at least one embodiment of the present disclosure.

FIG. 9 is a schematic diagram of another driving circuit board provided by at least one embodiment of the present disclosure. For example, as shown in FIG. 9, on the basis of the example shown in FIG. 7, the driving circuit board 20 further includes a fourth contact pad P4 and a voltage signal circuit 23 connected to the fourth contact pad P4. For example, the voltage signal circuit 23 is configured to provide a supply voltage (e.g., the common voltage or a touch-control driving voltage or other supply voltages) to the fourth contact pad P4. For example, the voltage signal circuit 23 may be prepared directly on the substrate of the driving circuit board 20, or implemented as an integrated circuit chip mounted on the substrate of the driving circuit board 20 in an appropriate manner (e.g., Bonding) and electrically connected to the lines on the substrate, and then electrically connected to the fourth contact pad P4.

The driving circuit board, the data driving circuit 21, the touch detection circuit 22 provided by above embodiments of the present disclosure may share at least part of the contact pads, thereby allowing one first data line and one touch-control line of the touch display panel to share one contact pad, thus reducing the number of contact pads, and increasing the pad pitches, which is advantageous for implementation of high-resolution display.

The transistors used in embodiments of the present disclosure can all be thin film transistors or field effect transistors or other switch devices with the same characteristics. The embodiments of the present disclosure are illustrated by taking thin-film transistors as an example. The source and drain of each transistor used herein can be symmetrical in structures, so that the source and drain may have no difference in structures. In the embodiments of the present disclosure, in order to distinguish between the two electrodes of each transistor other than the gate, one of the two electrodes is directly described as the first electrode, and the other as the second electrode. In addition, the transistors can be divided into N-type and P-type transistors according to the characteristics of the transistors. When a transistor is P-type transistor, a turn-on voltage thereof is a low-level voltage and a turn-off voltage thereof is a high-level voltage. When a transistor is N-type transistor, the turn-on voltage thereof is a high-level voltage and the turn-off voltage thereof is a low-level voltage.

In addition, the transistors in the embodiments of the present disclosure are all illustrated as N-type transistors, and in this case, the first electrode of each transistor is the drain, and second electrode is the source. It should be noted that the present disclosure is not limited to this. For example, one or more transistors of the respective selection switches provided by embodiments of the present disclosure may also adopt P-type transistors, wherein the first electrode of each transistor is the source and the second electrode is the drain. It is only required to connect the electrodes of the selected type of transistors by referring the connections of respective electrodes of the transistors in the embodiments of the present disclosure, and supply corresponding high or low voltages to the corresponding voltage terminals. If N type transistors are used, Indium Gallium Zinc Oxide (IGZO) can be used as the active layer in thin-film transistors, and compared with use of low-temperature polysilicon (LTPS) or amorphous silicon (e.g., hydrogenated amorphous silicon) as the active layer of the thin-film transistors, the size of the transistors can be effectively reduced and current leakage is prevented.

At least one embodiment of the present disclosure also provides a touch display device. For example, in some examples, the touch display device includes, for example, the touch display panel as shown in FIG. 1 and the driving circuit board as shown in FIG. 7. For example, in other examples, the touch display device may include the touch display panel as shown in FIG. 6A or FIG. 6B and the driving circuit board as shown in FIG. 9.

Figure 10:
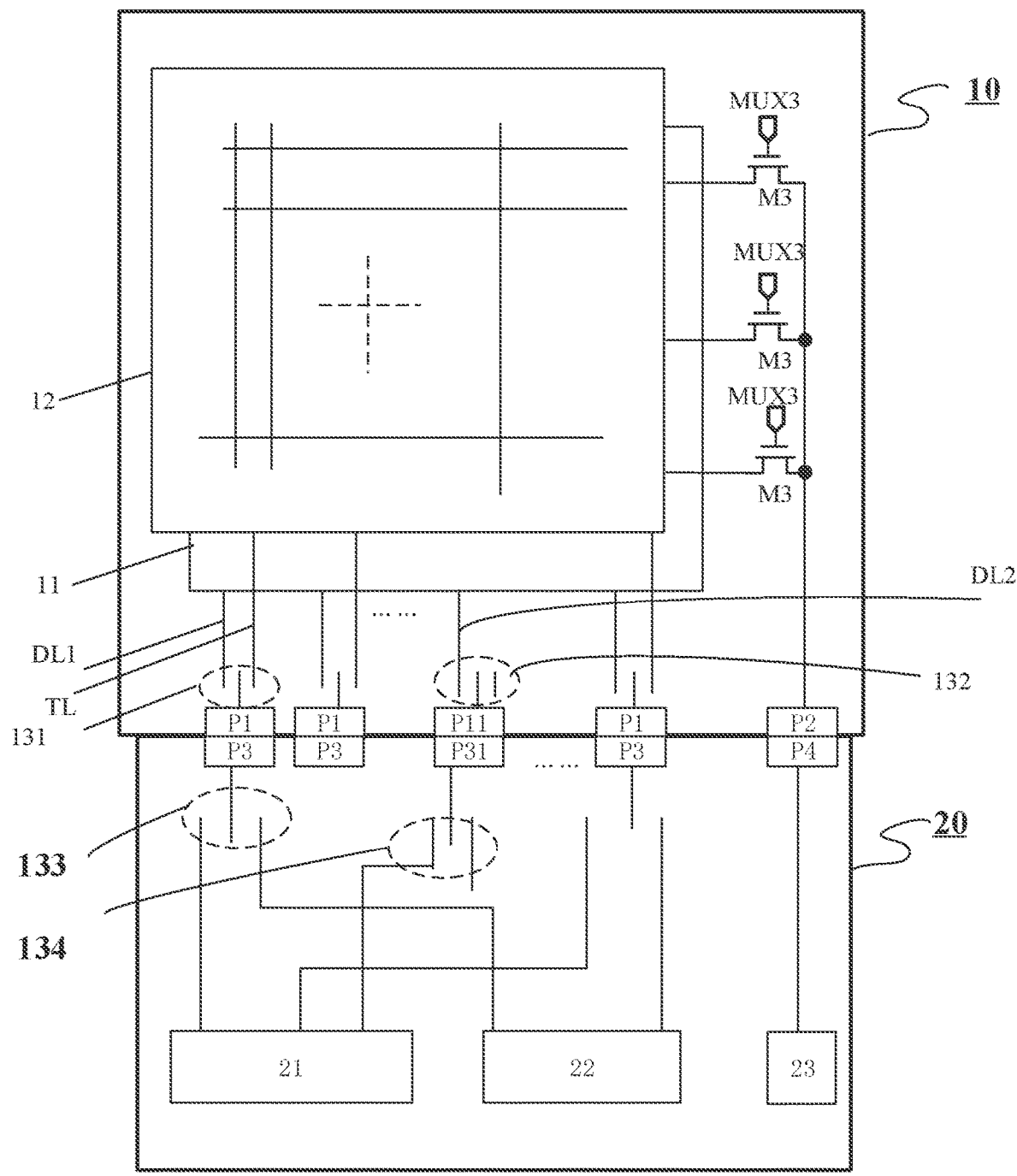
FIG. 10 is a schematic diagram of a touch display device provided by at least one embodiment of the present disclosure.
Figure 11:
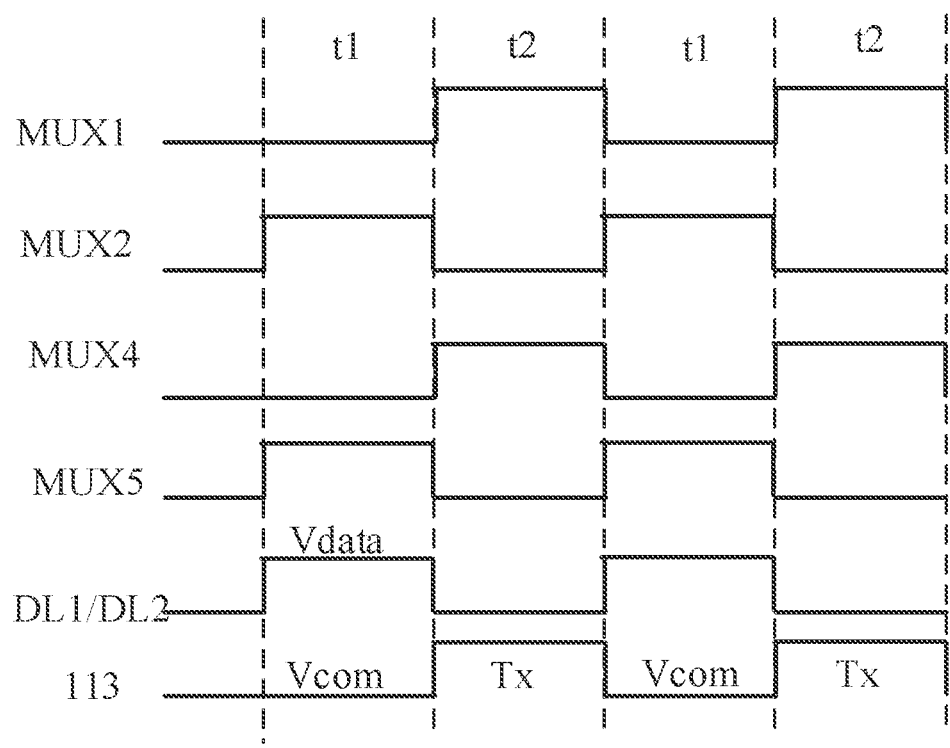
FIG. 11 is a signal timing diagram of the touch display device provided by at least one embodiment of the present disclosure.

FIG. 10 is a schematic diagram of the touch display device provided by at least one embodiment of the present disclosure. FIG. 11 is a signal timing diagram of the touch display device provided by at least one embodiment of the present disclosure. As shown in FIG. 10, the touch display device includes the touch display panel as shown in FIG. 6B and the driving circuit board as shown in FIG. 9. The touch display device shown in FIG. 10 is illustrated below by taking the first selection switch in FIG. 2A and the second selection switch in FIG. 8 as an example. The embodiments of the present disclosure are not limited thereto. Hereinafter, the operating principle of the touch display device provided by the embodiments of the present disclosure is described in detail with reference to FIGS. 10 and 11.

For example, as shown in FIG. 10, the plurality of first contact pads P1 and the plurality of third contact pads P3 are electrically connected in an one-to-one correspondence manner, and the second contact pad P2 and the fourth contact pad P4 are connected in an one-to-one correspondence manner, thereby enabling the bonding of the touch display panel 10 and the driving circuit board 20.

For example, in some examples, when the touch display panel 10 includes a plurality of first data contact pads P11 (only one first data contact pad P11 is shown by way of example), the plurality of first data contact pads P11 may also be connected in one-to-one correspondence with the third contact pads P3 (not shown in the figure).

For example, as shown in FIG. 10, when the touch display panel 10 further includes a plurality of first data contact pads P11 and the driving circuit board 20 further includes a plurality of second data contact pads P31, the plurality of first data contact pads P11 and the plurality of second data contact pads P31 are connected in an one-to-one correspondence manner.

For example, as shown in FIG. 11, during the display phase t1, the first switch signal terminal MUX1 provides a signal of low level, and the second switch signal terminal MUX2 provides a signal of high level, the fourth switch signal terminal MUX4 provides a signal of low level, and the fifth switch signal terminal MUX5 provides a signal of high level. Therefore, each first transistor M1 and each fourth transistor M4 are turned off, and each second transistor M2, each second collocated transistor M12, each fifth transistor M5 and each fifth collocated transistor M15 are turned on such that the first data lines DL1 and the first contact pads P1 are connected, and the second data lines DL2 are connected to the first data contact pads P11, and the third contact pads P3 are electrically connected to the data driving circuit 21. Since first contact pads P1 and the third contact pads P3 are connected, and the first data contact pads P11 and the second data contact pads P31 are connected, the first data lines DL1 and the second data lines DL2 are electrically connected to the data driving circuit 21, thus the data signal Vdata provided by the data driving circuit 21 is transmitted to the first data lines DL1 via the third contact pads P3 and the first contact pads P1, and transmitted to the second data lines DL2 via the first data contact pads P11 and the second data contact pads P31, and the data signal is transmitted to the pixel electrodes 114 of the pixel units in the display circuit array 11 via the first data lines DL1 and the second data lines DL2, to drive the pixel units to emit light.

During this phase, the common signal line 113 provides the common signal Vcom to the touch-control circuit array, so that the touch-control circuit array (e.g., the first touch-control electrodes) may be multiplexed as the common electrodes. Thus, During this phase, it is possible to charge the capacitor formed by the pixel electrode 114 and the common electrode 113 in the pixel unit 110 shown in FIG. 4B, thereby forming an electric field to control the deflections of the liquid crystal molecules.

During the touch stage t2, the first switch signal terminal MUX1 provides a signal of high level, the second switch signal terminal MUX2 provides a signal of low level. the fourth switch signal terminal MUX4 provides a signal of high level, and the fifth switch signal terminal MUX5 provides a signal of low level, so that the first transistor M1 and the fourth transistor M4 are turned on, and the second transistor M2 and the fifth transistor M5 are turned off, causing the touch-control lines TL connected to the first contact pads P1, and the third contact pads P3 electrically connected to the touch detection circuit 22. Since the first contact pads P1 and the third contact pads P3 are connected, the touch-control lines TL are electrically connected to the touch detection circuit 22, such that the touch-control sensing signal generated by the touch-control circuit array 12 is transmitted to the touch detection circuit 22 on the driving board 20 via the touch-control lines TL, the first contact pads P1 and the third contact pads P3, and the touch detection circuit 22 determines touch positions(for example, the touch position of a finger or stylus, etc.) on the touch display panel 10, according to the capacitance changes in the touch-control sensing signal, thereby enabling the touch function.

During this phase, the common signal line 113 provides the touch-control driving signal Tx to the touch-control circuit array to generate the touch-control sensing signal. Thus, during this phase, the touch-control circuit array acts as the touch-control electrodes.

For example, when the touch-control circuit array 12 perform the touch detection based on the self-capacitance shown in FIG. 5A, the third switch signal terminal provided a signal of high level during both the display phase t1 and touch phase t2 simultaneously, to allow the third transistors M3 in respective rows to be turned on simultaneously, so that the signal for providing the common voltage or the touch-control driving signal is transmitted to the touch-control circuit array 12 via the common signal line 113 simultaneously. When the touch-control circuit array 12 perform the touch detection based on the mutual-capacitance shown in FIG. 5B, the third switch signal terminal provide a signal of high level during the display phase t1, to allow the third transistors M3 in respective rows to be turned on simultaneously to provide the signal for providing the common voltage to the touch-control circuit array via the common signal line 113, and, during the touch-control phase, the third switch signal terminal provides a signal of high level line by line to control the third transistors M3 to be turned on line by line to input the touch driving signal on the common signal line 113 to the touch-control circuit array line by line, to achieve the scanning of the touch display panel line by line, thus enabling the touch-control function.

For example, the touch control phase t2 may be located during a blanking phase in a frame of the display. For example, both the second transistor M2 and the fifth transistor M5 are turned off during this phase, and the gate scanning signal is of a turn-off level to turn off the display, so that the touch detection of the touch display device will not be affected.

It should be noted that for the sake of clarity and brevity, the embodiments of the present disclosure do not give the all of composition units of the touch display device 30. In order to realize the basic function of the touch display unit 30, those skilled in the art can provide and set other structures not shown, and the embodiments of the present disclosure are not limited thereto.

Technical effects of the touch display panel provided by the above mentioned embodiments may be referred to that of the touch display panel or the driving circuit board provided in the embodiments of the present disclosure, which will not be described in detail herein.

At least one embodiment of the present disclosure further provides a driving method for driving the touch display device as shown in FIG. 10. For example, in some examples, the driving method comprises the following operations.

During the display phase, the first selection switch(es) 131 electrically connects the first contact pad(s) P1 to the first data line(s) DL1 in response to a first control signal, and the second selection switch(es) 133 electrically connects the third contact pad(s) P3 to the data driving circuit 21 in response to a second control signal.

During the touch phase, the first selection switch(es) 131 electrically connects the first contact pad(s) P1 to the touch-control line(s) TL, in response to the first control signal, and the second selection switch(es) 133 electrically connects the third contact pad(s) P3 to the touch detection circuit 22 in response to the second control signal.

For example, in other examples, when the touch display device 30 includes a common electrode line, the driving method further comprises the following operations.

During the display phase, the common signal line 113 provides a common voltage to the touch-control circuit array 12.

During the touch phase, the common signal line 113 provides a touch signal (e.g., the touch driving signal) to the touch-control circuit array 12.

It should be noted that, in the embodiments of the present disclosure, the process of the driving method may include more or fewer operations. The operations can be executed sequentially or in parallel. The driving method described above may be executed once or may be executed multiple times according to predetermined conditions.

The technical effects of the driving methods provided in the above embodiments can be referred to the technical effects of the touch display device provided in the embodiments of the present disclosure and will not be described in detail herein.

It should be noted that:
(1) the drawings of the examples of the present disclosure relate only to the structures involved with the embodiments of the present disclosure, and other structures may refer to the usual designs.
(2) without conflict, the embodiments of the present disclosure and features of the embodiments may be combined with each other to obtain new embodiments.

The foregoing description merely illustrates exemplary embodiments of the present disclosure and is not intended to limit the scope of protection of the present disclosure, which is determined by the appended claims.

The invention claimed is:

1. A touch display panel, comprising:
   a plurality of first data lines;
   a plurality of touch-control lines;
   a plurality of first contact pads;
   a plurality of first selection switches connected to the plurality of first contact pads in an one-to-one correspondence manner;
   a plurality of second data lines, a plurality of first dummy selection switches, and a plurality of first data contact pads, wherein each first dummy selection switch has a same structure as that of each first selection switch;
   wherein each first selection switch is electrically connected to one first contact pad, one first data line and one touch-control line, and the first selection switch is configured to receive a first control signal and, according to the first control signal, electrically connect the first contact pad and the first data line during a first time period and electrically connect the first contact pad and the touch-control line during a second time period, and the first time period and the second time period do not overlap,
   wherein, each first dummy selection switch is electrically connected to one first data contact pad and one second data line, and is configured to receive the first control signal, and electrically connect the first data contact pad and the second data line according to the first control signal.

2. The touch display panel according to claim 1, wherein the first selection switch includes a first transistor and a second transistor; wherein,
   a first electrode of the first transistor is connected to the touch-control line, a second electrode of the first transistor is connected to the first contact pad, and a gate of the first transistor is connected to a first switch signal terminal and is configured to receive a first switch signal to control turn-on and turn-off of the first transistor;
   a first electrode of the second transistor is connected to the first data line, a second electrode of the second transistor is connected to the first contact pad, and a gate of the second transistor is connected to a second switch signal terminal and is configured to receive a second switch signal to control turn-on and turn-off of the second transistor;
   wherein the first control signal is configured to include the first switch signal and the second switch signal.

3. The touch display panel according to claim 1, wherein the first selection switch includes a first transistor and a second transistor; wherein,
   a first electrode of the first transistor is connected to the touch-control line, a second electrode of the first transistor is connected to the first contact pad through a wiring, and a gate of the first transistor is connected to a first control signal terminal to receive the first control signal;
   a first electrode of the second transistor is connected to the first data line, a second electrode of the second transistor is connected to the first contact pad through the wiring, and a gate of the second transistor is connected to the gate of the first transistor;
   wherein the first transistor is an N-type transistor, the second transistor is a P-type transistor, or the first transistor is an P-type transistor, the second transistor is a N-type transistor.

4. The touch display panel according to claim 1, further comprising a display circuit array, wherein the display circuit array includes a plurality of columns of pixel units, each column of pixel units includes a plurality of columns of sub-pixels, and the plurality of columns of sub-pixels are connected to a same first data line or a same second data line.

5. The touch display panel according to claim 1, further comprising a touch-control circuit array, wherein the touch-control circuit array includes a plurality of first touch-control electrodes, each first touch-control electrode is connected to one touch-control line, and wherein each first touch-control electrode is a self-capacitive electrode.

6. The touch display panel according to claim 5, further comprising a common signal line, wherein the common signal line is connected to the first touch-control electrode.

7. The touch display panel according to claim 6, wherein the first selection switch further includes a third transistor, wherein a first electrode of the third transistor is connected to the common signal line, a second electrode of the third transistor is connected to the first touch-control electrode, and a gate of the third transistor is connected to a third switch signal terminal and is configured to receive a third switch signal, to control turn-on or turn-off of the third transistor.

8. The touch display panel according to claim 6, further comprising a second contact pad, wherein the second contact pad is connected to the common signal line to provide a voltage signal to the common signal line.

9. The touch display panel according to claim 5, further comprising a display circuit array, wherein the display circuit array includes common electrodes, the plurality of the first touch-control electrodes are multiplexed as the common electrodes, and the plurality of the first touch-control electrodes are configured to receive a common voltage.

10. The touch display panel according to claim 1, further comprising a touch-control circuit array, wherein the touch-control circuit array includes a plurality of touch sensors arranged in an array, each touch sensor includes a first touch-control electrode and a second touch-control electrode, and second touch-control electrodes of touch sensors in each column are connected to a same touch-control line.

11. A touch display device, comprising:
    the touch display panel according to claim 1; and
    a driving circuit board, comprising:
    a data driving circuit;
    a touch detection circuit;
    a plurality of second contact pads;
    a plurality of second selection switches connected to the plurality of second contact pads in an one-to-one correspondence manner;
    wherein each second selection switch is electrically connected to one second contact pad, the touch detection circuit and the data driving circuit, and the second selection switch is configured to receive a second control signal and, according to the second control signal, electrically connect the second contact pad and the data driving circuit during a first time period and electrically connect the second contact pad and the data driving circuit during a second time period, and the first time period and the second time period do not overlap;

wherein the plurality of first contact pads and the plurality of second contact pads are electrically connected in an one-to-one correspondence manner.

12. The touch display device according to claim 11, wherein the touch display panel comprises a third contact pad connected to a common signal line to provide a voltage signal to the common signal line;

the driving circuit board includes a fourth contact pad and a voltage signal circuit connected to the fourth contact pad, wherein the voltage signal circuit is configured to provide a voltage signal to the fourth contact pad;

wherein the third contact pad and the fourth contact pad are connected in an one-to-one correspondence manner.

13. The touch display device according to claim 11, wherein the plurality of first contact pads and the plurality of first contact pads on the touch display panel are connected to the plurality of second contact pads on the driving circuit board in an one-to-one correspondence manner.

14. The touch display device according to claim 11, wherein the driving circuit board further comprises:

a plurality of second dummy selection switches, and a plurality of second data contact pads, wherein each second dummy selection switch has a same structure as each second selection switch; wherein, each second dummy selection switch is electrically connected to one second data contact pad and the data driving circuit, and is configured to receive a second control signal, and electrically connect the second data contact pad and the data driving circuit according to the second control signal;

wherein the plurality of first data contact pads and the plurality of second data contact pads are connected in an one-to-one correspondence manner.

15. A driving method for driving the touch display device according to claim 11, comprising:

during a display phase, the first selection switch electrically connecting the first contact pad and the first data line in response to the first control signal, the second selection switch electrically connecting the second contact pad and the data driving circuit in response to the second control signal; and during a touch-control phase, the first selection switch electrically connecting the first contact pad and the touch-control line in response to the first control signal, the second selection switch connecting the third contact pad and the touch detection circuit in response to the second control signal.

16. The driving method according to claim 15, wherein the touch display device comprises a common signal line, and the driving method comprises:

during the display phase, the common signal line providing a common voltage to the touch-control circuit array; and during the touch phase, the common signal line providing a touch-control signal to the touch-control circuit array.

17. A driving circuit board for a touch display panel, comprising:

a data driving circuit;

a touch detection circuit;

a plurality of first contact pads;

a plurality of first selection switches connected to the plurality of first contact pads in an one-to-one correspondence manner;

a plurality of first dummy selection switches and a plurality of first data contact pads, wherein each first dummy selection switch has a same structure as each first selection switch;

wherein each first selection switch is electrically connected to one first contact pad, the touch detection circuit and the data driving circuit, and the first selection switch is configured to receive a first control signal and, according to the first control signal, electrically connect the first contact pad and the data driving circuit during a first time period and electrically connect the first contact pad and the data driving circuit during a second time period, and the first time period and the second time period do not overlap, wherein, each first dummy selection switch is electrically connected to one first data contact pad and the data driving circuit, and is configured to receive the first control signal, and according to the first control signal, electrically connect the first data contact pad and the data driving circuit.

18. The driving circuit board according to claim 17, further comprising a second contact pad and a voltage signal circuit connected to the second contact pad, wherein the voltage signal circuit is configured to provide a voltage signal to the second contact pad.

* * * * *